April 20, 1954 A. KARDOS 2,676,140
MALTING APPARATUS
Filed July 17, 1952 5 Sheets-Sheet 1

INVENTOR.
ANDREW KARDOS
BY Joseph Montgomery
ATTORNEY

April 20, 1954   A. KARDOS   2,676,140
MALTING APPARATUS
Filed July 17, 1952   5 Sheets-Sheet 2
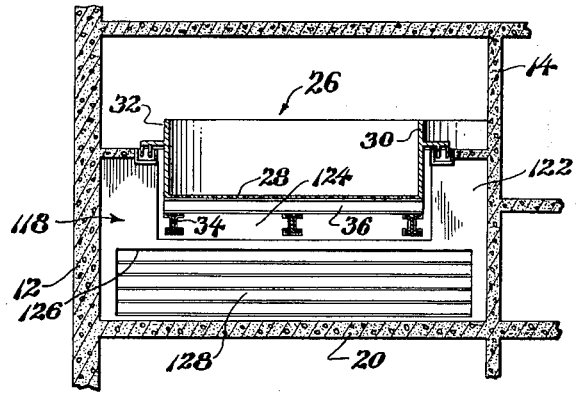
Fig.~6~
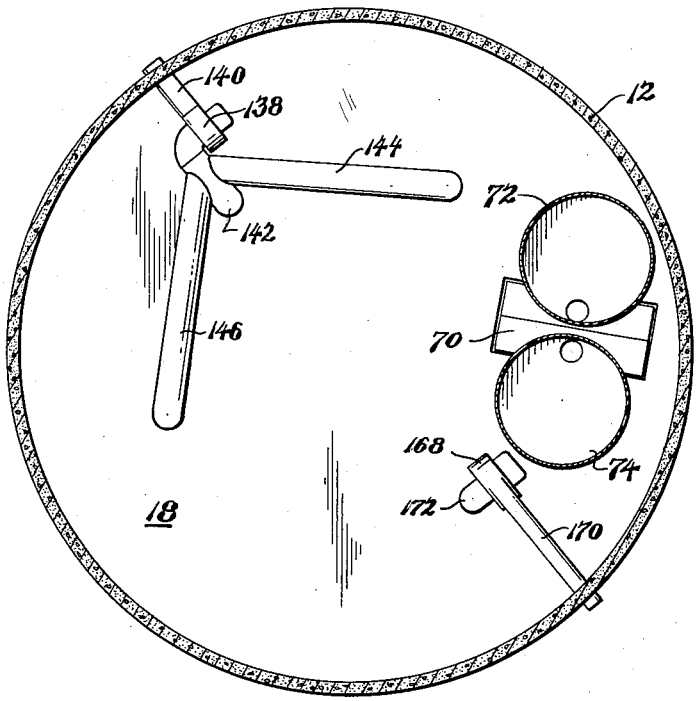
Fig.~2~
INVENTOR.
ANDREW KARDOS
BY
ATTORNEY

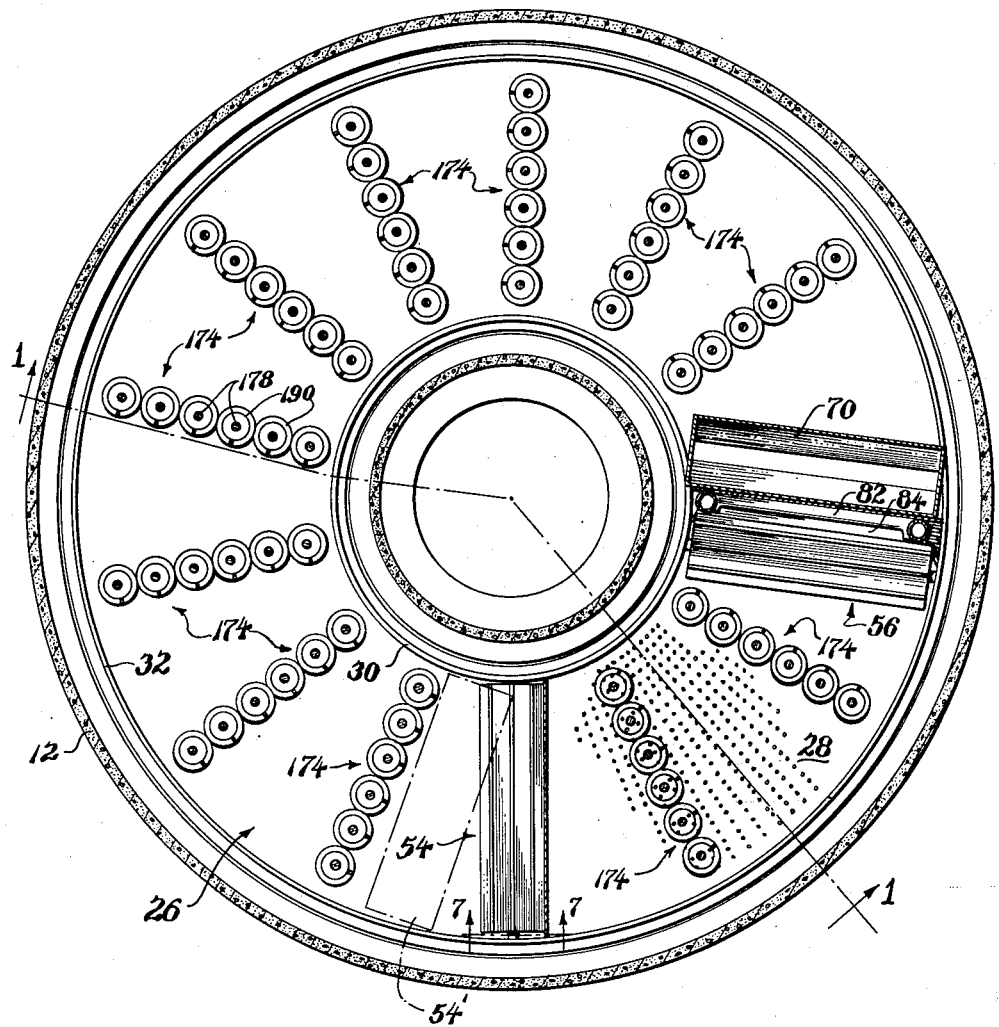
Fig.~3~

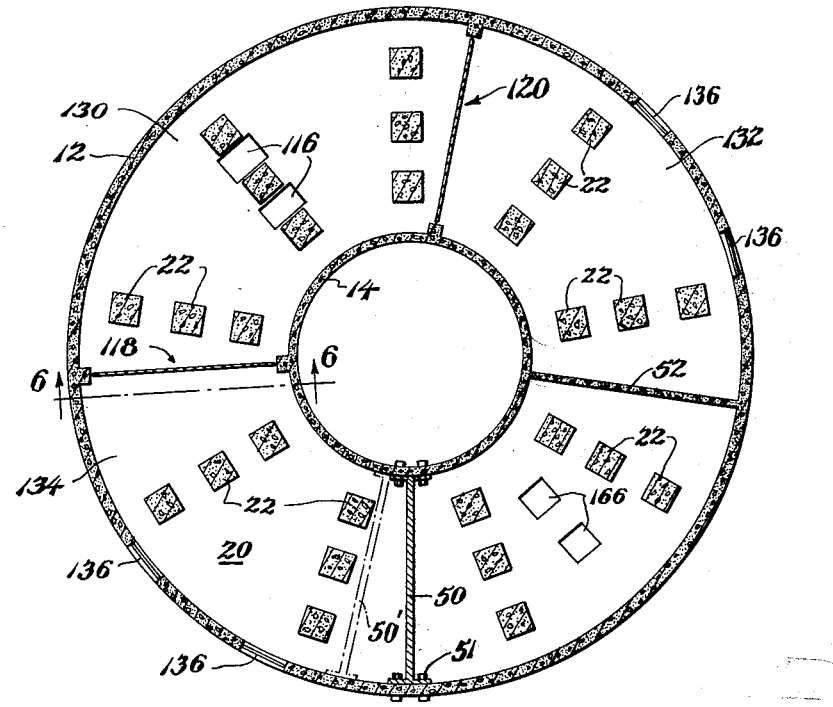
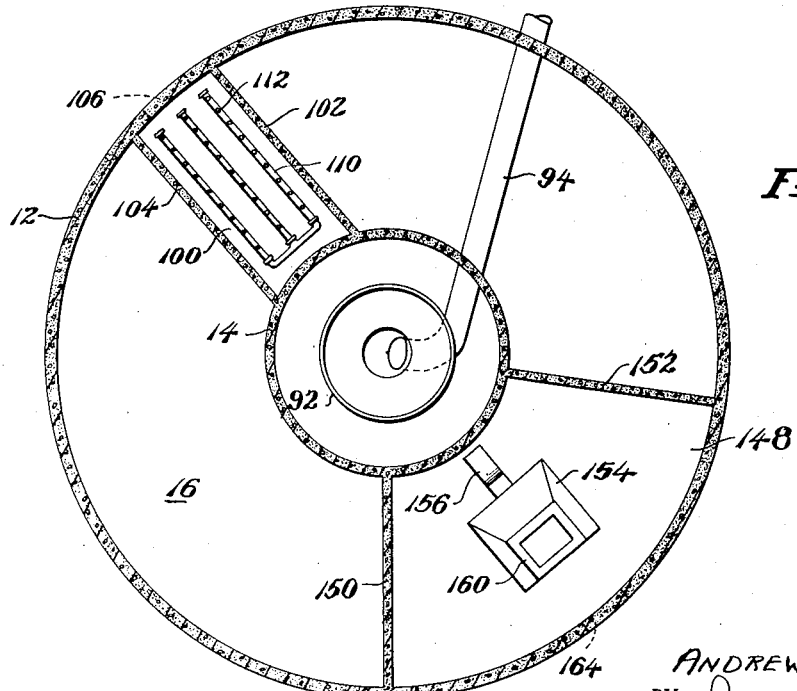

April 20, 1954  A. KARDOS  2,676,140
MALTING APPARATUS
Filed July 17, 1952  5 Sheets-Sheet 5
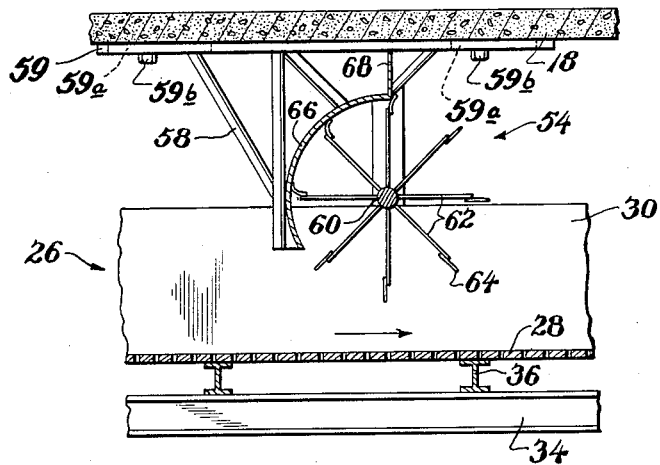
Fig. ~7~
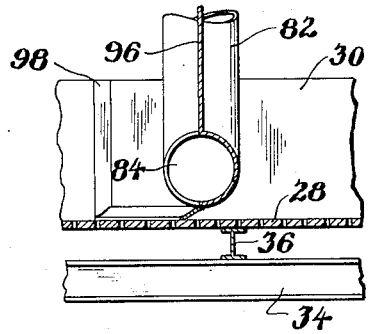
Fig. ~8~
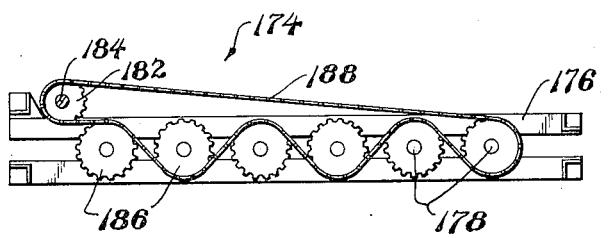
Fig. ~9~
INVENTOR.
ANDREW KARDOS
BY Jack Montgomery
ATTORNEY Patented Apr. 20, 1954

2,676,140

UNITED STATES PATENT OFFICE 2,676,140

MALTING APPARATUS

Andrew Kardos, Fairlawn, N. J.

Application July 17, 1952, Serial No. 299,401

14 Claims. (Cl. 195—130)

The present invention relates generally to malting apparatus, and is particularly directed to apparatus for producing malt in a continuous manner.

Heretofore, apparatus used for producing malt has generally consisted of separate germinating and drying or kilning compartments. Grain is initially steeped in suitable steeping tanks. A batch of the steeped grain is then deposited in the germinating compartments. The germination is controlled by passing air of controlled humidity and temperature through the grain and by frequent agitation. When the germination is completed, the batch of malt is scooped from the germinating compartments and carried to the drying or kiln compartments where heated air is passed through the malt to reduce the moisture content of the latter. Finally, the dried malt is removed from the kiln compartments and transported to a location where it is cleaned and stored.

While modern malt plants of the kind described above use numerous mechanical devices, such as power shovels, elevators, and conveyors, to reduce the manual labor involved in transporting the grain and malt between the several stationary compartments, such apparatus is necessarily complex and expensive and is inherently inefficient in its utilization of the space required for the various separate compartments. Further, the production of malt in batches results in the interruption of the process during the emptying and refilling of the compartments.

Accordingly, a primary object of the present invention is to provide apparatus for continuously producing malt and without interruptions between the germinating and drying stages of the process.

Another object of the present invention resides in the provision of relatively compact and simple apparatus for the continuous production of malt.

Still another object is to reduce to a minimum the human labor and supervision required in the continuous production of malt.

A further object of the present invention is to provide apparatus for the continuous production of malt which permits the accurate control of the conditions under which the germination of the grain and drying of the malt takes place.

A still further object is to provide malt producing apparatus which includes at least one continuously moving conveyor receiving the steeped grain at a loading station and carrying the grain through germinating and drying zones to an unloading station at which the malt is automatically removed to again prepare the conveyor for the reception of steeped grain.

A still further object is to provide malt producing apparatus of the described character wherein the germinating and drying or kiln zones, through which the conveyor travels, are effectively sealed from each other so that the temperature and humidity of the air in the respective zones may be effectively controlled, and wherein the relative lengths of the germinating and drying zones are variable to provide a further measure of control over the malting process.

In accordance with the present invention, the foregoing and other objects and advantages are accomplished by providing at least one annular conveyor including a perforated bottom and circular inner and outer side walls. The conveyor is supported within a housing for rotation at a slow speed so that it completes a single revolution in the time required for the germination and drying of the malt. The housing includes at least four levels or stories with the perforated bottom of the conveyor forming part of the separation between the second and third stories. Radial partitions are provided in the second and third stories to divide the latter into a germinating zone and a kiln area or zone with the relative angular extents of these zones being proportional to the relative periods required for the germination of the steeped grain and the drying of the malt, and at least one of the radial partitions in each of the second and third stories is angularly adjustable to vary the relative periods of travel of the conveyor through the germinating zone and the kiln area. The radial partitions in the third story include rotatable sealing vanes which dip into the grain on the conveyor to effectively prevent mixing of the air in the germinating and kiln zones above the conveyor. Further, shutter arrangements are provided below the conveyor in the germinating zone of the second story to divide the latter into a plurality of sections having controlled communication therebetween. The first story of the housing is provided with an attemperating room and a heater room respectively positioned under the germinating and kiln zones and communicating with the related portions of the second story. Thus, air is drawn into the attemperating room and suitably cooled and humidified before being passed upwardly through that portion of the conveyor disposed in the germinating zone. The above mentioned shutter arrangements provide for mixing of the air coming from the attemperating room with atmospheric air to produce the desired conditions at various parts of the germinating zone. The air drawn into the heater room is passed upwardly through the portion of the conveyor disposed in the kiln zone to dry the malt carried by that portion of the conveyor. Steeping tanks are provided in the fourth story of the housing and discharge into a feeding hopper extending across the conveyor at the beginning of the germinating zone for continuously depositing steeped grain on the perforated bottom of the conveyor. An automatic unloading device, which may be of the vacuum or suction type, extends across the conveyor between the above mentioned hopper and the partition separating the beginning of the germinating zone from the kiln zone to continuously remove the dried malt from the conveyor for transportation to a cleaning and storage area and to condition the conveyor for the reception of steeped grain from the feeding hopper.

The above objects, features and advantages of the present invention will be apparent in the following detailed description of an illustrative embodiment which is to be read in connection with the accompanying drawings forming a part hereof and wherein:

Fig. 2 is a horizontal, sectional view taken along line 2—2 of Fig. 1, but on a smaller scale;

Fig. 3 is a horizontal, sectional view taken along line 3—3 of Fig. 1, but on a smaller scale;

Fig. 4 is a horizontal, sectional view taken along line 4—4 of Fig. 1, but on a smaller scale;

Fig. 5 is a horizontal, sectional view taken along line 5—5 of Fig. 1, but on a smaller scale;

Fig. 6 is a fragmentary, vertical, sectional view taken along line 6—6 of Fig. 4, but on an enlarged scale;

Fig. 7 is a fragmentary, vertical, sectional view taken along line 7—7 of Fig. 3, but on an enlarged scale;

Fig. 8 is a fragmentary, vertical, sectional view taken along line 8—8 of Fig. 1, but on an enlarged scale; and Fig. 9 is a top plan view, on an enlarged scale, of a grain turning unit included in the apparatus embodying the present invention.

Figure 1:
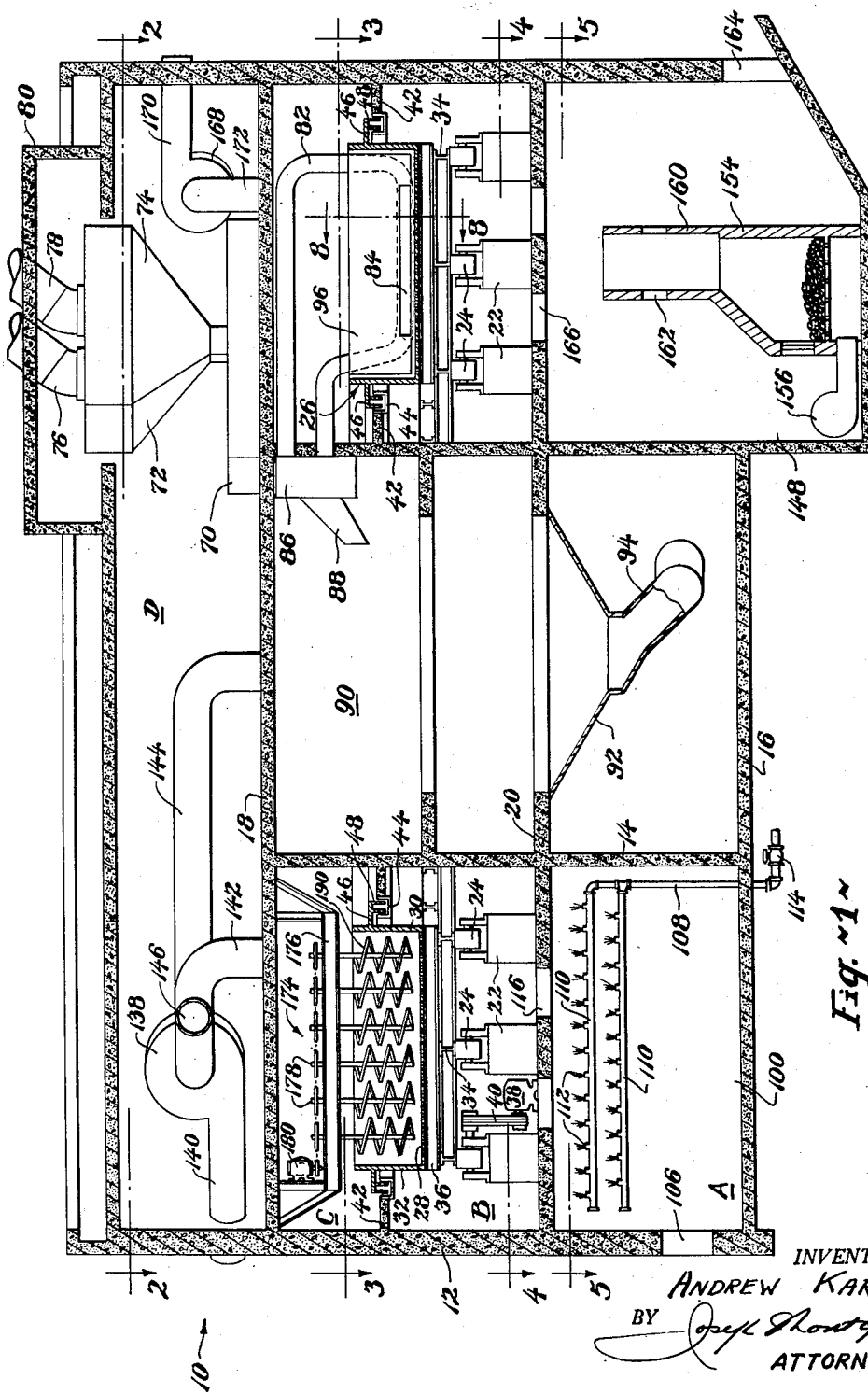
Fig. 1 is a vertical sectional view of a malt producing apparatus embodying the present invention and taken along line 1—1 of Fig. 3, but on an enlarged scale and with certain parts removed for the purpose of clarity.

Referring to the drawings in detail, an apparatus for continuously producing malt and embodying the present invention is there generally identified by the reference numeral 10. The apparatus 10 includes a housing which may be formed of concrete or any other suitable materials and has a preferably circular outer wall 12. The interior of the housing is preferably divided into four superposed stores which are generally identified by the letters A, B, C and D, respectively.

The first or lowermost story A accommodates the facilities for controlling the humidity and temperature of the air employed in the germination and drying operations. The second story B has provision thereon for supporting and rotating a conveyor adapted to carry the grain throughout the production of malt therefrom. The third story C accommodates devices for loading steeped grain onto the conveyor, for removing the dried malt from the latter, and for gently turning the grain during the germinating and drying phases of the process. Finally, the top or fourth story D accommodates steeping tanks, from which the grain is drawn to be loaded onto the conveyor, and various blowers for inducing the air flow through the grain during the germinating and drying phases of the process.

Having set forth the general arrangement of the plant or apparatus 10, reference will now be made to the specific structure thereof. A circular inner wall 14 extends between a floor 16, defining the bottom of the first story A, and a floor 18 which separates the third and fourth stories C and D. A floor 20 separates the first and second stories A and B and is formed with a series of pylons or uprights 22 (Figs. 1 and 4), each of which supports a roller 24 on its upper end (Fig. 1). A conveyor, generally indicated by the numeral 26, includes an annular, perforated bottom 28 and circular inner and outer side walls 30 and 32, respectively, which extend upwardly from the inside and outside edges of the bottom 28. In order to mount the conveyor 26 on the rollers 24 for rotation within the annular space between the housing walls 12 and 14, concentric circular tracks 34 are positioned below the perforated bottom 28 and may be spaced from the latter by suitable radial members 36, as shown in Figs. 1, 7 and 8. Movement of the conveyor 26 is effected by a suitable electric motor 38 which is operatively connected to one of the rollers 24 by a belt and pulley transmission 40 (Fig. 1).

The perforated bottom 28 of the conveyor 26 forms part of the separation between the second and third stories B and C. In order to complete this separation and to ensure that any air flow between these stories will occur through the perforated bottom of the conveyor, sealing arrangements are provided between the outer wall 12 of the housing and the adjacent side wall 32 of the conveyor and also between the inner wall 14 of the housing and the adjacent side wall 30 of the conveyor. Each of these sealing arrangements includes an annular, horizontal member 42 extending from the related vertical wall of the housing and having an upwardly opening trough 44 along its free edge. The horizontal members 42 may serve as walkways from which the progress of the germination and drying of grain on the conveyor 26 may be observed. The side walls 30 and 32 of the conveyor are provided with annular flanges 46 which overlie the related troughs 44 and terminate in rings 48 extending into the troughs and having inverted U-shaped cross-sections. A suitable liquid is provided in the troughs 44 to a level sufficient to immerse at least part of the rings 48 so that liquid seals are obtained between the side walls of the conveyor and the adjacent vertical walls of the housing.

While the illustrated embodiment of the invention includes only one annular conveyor 26, it is to be understood that several concentric conveyors, each similar to that described above, may be provided to economize on the space required.

In order to divide the second story B into germinating and kiln zones, vertical angularly spaced apart partitions 50 and 52 (Fig. 4) extend radially between the outer and inner walls 12 and 14 below the conveyor 26. The portions of the partitions 50 and 52 adjacent the conveyor are preferably formed of flexible material to provide an effective seal between the partitions and the conveyor without restricting rotational movement of the latter. As seen in Fig. 4, at least the partition 50 is mounted for angular movement so that it may be displaced to the broken line position 50' for varying the relative sizes of the germinating and kiln zones. In order to permit such movement of the partition 50, the opposite ends of the latter may have bolts 51 thereon which extend into suitable circumferential slots (not shown) formed in the walls 12 and 14. Division of the third story C, that is, the space above the conveyor, into corresponding germinating and kiln zones is achieved by sealing assemblies which are vertically aligned with the partitions 50 and 52 and are generally identified by the numerals 54 and 56, respectively (Fig. 3). Since the assemblies 54 and 56 are identical, only the sealing assembly 54 will be described in detail. The sealing assembly 54 includes a framework 58 depending from the floor 18 at the top of story C and rotatably supporting a horizontal shaft 60 at the ends of the latter. A series of vanes 62 extend radially from the shaft 60 along the length of the latter and have flexible strips 64 secured to their free edges. The framework 58 also supports an arcuate plate 66 which is concentric with the shaft 60 and has a vertical extension 68 spanning the gap between the upper end of plate 66 and the floor 18. The parts described above are dimensioned so that the vanes 62 will successively dip into the grain on the conveyor 26 as the latter moves in the direction of the arrow on Fig. 7 and causes rotation of the vanes and the shaft 60. Further, the curved plate 66 is arranged so that the flexible strips 64 will engage against the curved plate as the vanes are rotated. Thus, an effective seal will be provided to prevent communication between the germinating and kiln zones in the third story C, and this seal will be effective even when the level of grain on the conveyor is varied so long as the grain is sufficiently deep to immerse at least the edge portions of the vanes 62.

In order to provide for varying of the relative sizes of the germinating and kiln zones in the third story C, the sealing assembly 54 is preferably mounted in a manner to permit angular adjustment thereof. For this purpose, the frame 58 may include a mounting plate 59 having elongated slots 59a which receive supporting bolts 59b extending downwardly from the floor 18. Thus, the sealing assembly 54 may be adjusted, for example, to the broken line position 54' of Fig. 3, to increase the length of the kiln zone while correspondingly decreasing the length of the germinating zone. It is of course understood that the partition 50 and the sealing assembly 54 will be simultaneously adjusted so that the relative lengths of the germinating and kiln zones above and below the conveyor will be the same.

The angular spacing between the partitions 50 and 52, as well as between the sealing assemblies 54 and 56, is selected to provide the necessary relationship between the period of time required for travel through the germinating zone and the period of time required for travel through the kiln zone. Thus, if the germinating period is to be five days and the drying period one and one-half days, transmission 40 connecting the motor 38 to the driving roller will be constructed to produce one complete revolution of the conveyor 26 during six and one-half days, and the angle included between the partitions 50 and 52 will be approximately 83°, as shown in Fig. 4.

In accordance with the present invention, steeped grain is continuously deposited upon the conveyor 26 at the beginning of the germinating zone, while the dried malt is continuously removed from the conveyor at the conclusion or end of the kiln zone. Thus, with the conveyor 26 rotating in the counter-clockwise direction, as viewed in Fig. 3, the loading of grain onto the conveyor and the removal of the dried malt from the conveyor occur at locations adjacent the sealing assembly 56.

The arrangement for feeding steeped grain to the conveyor includes a hopper assembly 70 located at a loading station adjacent sealing assembly 56 and which extends across the conveyor 26 and receives steeped grain from suitable steeping tanks or cisterns 72 and 74 (Figs. 1, 2 and 3). The steeping tanks 72 and 74 are disposed in the fourth story D and receive the grain through conduits 76 and 78 projecting from a penthouse 80 on the roof of the housing. The hopper assembly 70 has conventional means therein for controlling the rate of discharge of the steeped grain onto the continuously moving conveyor.

An arrangement for removing the dried malt from the conveyor at the conclusion of the operating cycle of apparatus 10 is shown in Figs. 1, 3 and 8 and includes a conduit or pipe 82 supported within the third story C at a fixed location or discharge station between the hopper assembly 70 and the sealing assembly 56 and having a straight section disposed within the conveyor adjacent the perforated bottom 28 of the latter and formed with a longitudinal cutout or opening 84 at the side thereof facing in the direction opposed to the movement of the conveyor. The opposite ends of the conduit 82 are connected to intake of a blower assembly 86 (Fig. 1) so that a suction is produced within the conduit 82. The discharge or outlet of the blower assembly 86 leads to a spout 88 within the central space 90 defined by the inner vertical wall 14 of the housing. Thus, the blower assembly 86 operates to produce a strong air flow within the conduit 82 from the opening 84 of the latter, with this strong air flow carrying the dried malt from the conveyor for discharge at the spout 88 into the space 90. Further, a hopper 92 may be disposed at the bottom of space 90 in the first story A to receive the discharged malt and direct it into a conduit or conveyor pipe 94 leading to a location (not shown) where the malt may be cleaned and stored.

While the illustrated arrangement for continuously removing the dried malt from the conveyor at the completion of the drying phase of the process operates by suction or vacuum, it is apparent that other means, for example, mechanical conveyors of the screw or bucket type, may be employed to carry the malt from the opening 84 of the discharge conduit 82 to the spout 88.

In order to ensure that all of the dried malt is removed from the conveyor by the discharge conduit 82 and that the portion of the conveyor arriving at the loading station is conditioned to receive steeped grain from the hopper assembly 70, a plate member 96 extends around the opening 84 and shaped as a plow with flexible strips 98 being provided on the side and bottom edges thereof to closely engage the side walls and bottom of the conveyor. Thus, as successive portions of the conveyor reach the discharge station, the dried malt thereon is guided by the member 96 to the opening 84 for removal from the conveyor.

In order to permit the maintenance of the desired conditions of humidity and temperature within the germinating zone, the apparatus 10, in the first story A thereof, is provided with an attemperating room or chamber 100 (Figs. 1 and 5) which is preferably disposed immediately below the center of the germinating zone and is defined by spaced apart walls 102 and 104 extending between the outer and inner walls 12 and 14 of the housing. Atmospheric air is admitted to chamber 100 through suitable openings 106 formed in the outer wall 12 and provided, if desired, with adjustable shutters (not shown) for controlling the flow of air therethrough. A pipe 108 extends into chamber 100 from a source of water (not shown) and connects to manifolds 110 having spray nozzles 112 arranged therealong for creating a spray or mist of water within the attemperating chamber. A suitable valve 114 may be interposed in the pipe 108 to control the rate of discharge of water into the attemperating chamber 100.

The air humidified in chamber 100 passes to the germinating zone below the conveyor through openings 116 formed in the floor 20 between the walls 102 and 104. In order to permit variation of the condition of the air passing through the grain at different portions of the germinating zone, shuttered partition assemblies 118 and 120 (Figs. 4 and 6) are provided in story B below the conveyor at angularly spaced apart locations. Each of the shuttered partition assemblies 118 and 120 includes a fixed portion 122 having a cutout at the top to receive the conveyor and provided with a flexible sealing member 124 along the edges of the cutout to closely engage the bottom and sides of the conveyor. Further, the fixed portion 122 is formed with a rectangular opening 126 having shutter elements 128 extending thereacross and adjustable to regulate the flow of air through the opening 126. Thus, the space below the conveyor in the germinating zone is separated into a central section 130, defined between the shuttered partition assemblies 118 and 120, and sections 132 and 134 at opposite sides of the central section and respectively defined between the shuttered partition assembly 120 and the partition 52 and between the shuttered partition assembly 118 and the partition 50 (Fig. 4). The outer wall 12 of the housing may be formed with openings 136 communicating with sections 132 and 134 of the space below the conveyor in the germinating zone and the shuttered partition assemblies 118 and 120 provide control over the mixing of the humidified air entering the central section 130 and of the atmospheric air entering the sections 132 and 134.

In order to induce the flow of air from the sections 130, 132 and 134 upwardly through the perforated bottom 28 of the conveyor 26 and through the germinating grain in the germinating zone, an air exhaust system (Figs. 1 and 2) may be disposed in the fourth story D. This air exhaust system preferably includes a blower 138 driven by a suitable motor and having its discharge port connected to an exhaust conduit 140 and its intake port connected to branch conduits 142, 144 and 146 which open through the floor 18 into the space above the conveyor in the different locations within the germinating zone.

In order to provide heated air for drying the malt in the kiln zone, a heater room or chamber 148 is provided in the first story A below the kiln zone and defined between spaced vertical walls 150 and 152 extending radially from the outer wall 12 to the inner wall 14 (Figs. 1 and 5). A furnace 154 is provided in the heater chamber 148 and may have a blower 156 associated therewith to produce a forced draft. A casing 160 extending from the furnace is provided with openings 162 to permit air to enter the casing and to be heated by the gases passing therethrough. A suitable port 164 is formed in the outer wall 12 to permit air to enter the heater room, and the port 164 may also be used for the reception of coal when the furnace 154 is coal fired.

Openings 166 are formed in floor 20 between the space below the conveyor in the kiln zone and the heater room 148 to permit the heated air to enter the kiln zone. The temperature of the heated air may be varied by controlling the furnace 154. In order to induce the heated air to flow upwardly through the perforated bottom 28 of the conveyor and through the malt in the kiln zone, a blower system may be provided in story D above the kiln zone. This blower system preferably includes a blower 168 driven by a suitable motor and having its discharge port connected to an exhaust conduit 170 extending through wall 12 to the outside and its intake port connected to a conduit 172 extending through the floor 18 and opening at the space above the conveyor in the kiln zone.

Thus, as the conveyor 26 rotates, the grain deposited on the conveyor by the hopper assembly 70 is carried through the germinating zone while air of the proper humidity and temperature passes through the germinating grain. The germination of the grain is completed as it passes the sealing assembly 54 into the kiln zone and for the remainder of the cycle heated air is passed through the germinated grain or malt to effect the drying thereof. When the malt passes the sealing assembly 56, it has been suitably dried, and the malt is immediately removed from the conveyor for cleaning and storage.

In order to maintain the grain in a fluffy condition during the germination and drying thereof, turning machines, generally indicated by the reference numerals 174, are preferably provided at fixed locations in the germinating and kiln zones to gently turn the grain or malt as the conveyor rotates. In the illustrated embodiment of the invention, nine turning machines 174 are provided in the germinating zone and two of such machines are disposed in the kiln zone (Fig. 3), however, it is to be understood that the number of turning machines may be varied.

Further, instead of providing several turning machines at fixed locations within each of the germinating and kiln zones, as in the illustrated embodiment, one turning machine may be provided in each zone and mounted on overhead rails for movement along the path of the conveyor. The movable turning machines may be propelled back and forth in the respective zones to effect turning of the grain at all portions of the zones.

Referring to Figs. 1, 3 and 9, it will be seen that each of the turning machines 174 includes a framework 176 depending from the floor 18 and rotatably supporting a series of parallel, vertical shafts or spindles 178 which extend downwardly into the conveyor between the side walls 30 and 32 of the latter. A motor 180 is supported on the frame 176 and a suitable transmission is provided for simultaneously driving all of the spindles 178 from the motor 180. In the illustrated embodiment, this transmission includes a driving sprocket 182 mounted on the motor shaft 184, a driven sprocket 186 on the upper end of each spindle 178, and a continuous chain 188 meshing with the driving sprocket 182 and with each of the driven sprockets 186. A ribbon-type helix 190 is mounted on each spindle 178 to turn the grain as the conveyor moves past the gang of turning machines and the spindles are rotated. The turning machines 174 are preferably arranged so that the grain is turned across the entire width of the conveyor thereby preventing the occurrence of any relatively compact areas through which the air flow might be restricted.

From the foregoing description of the illustrated embodiment of the invention, it is apparent that apparatus for producing malt has been provided wherein the operation is continuous and the transferring of the grain or malt from one compartment to another has been avoided. Further, the described arrangement effects completely automatic loading and discharging of the grain and malt onto and from the conveyor, with the control of the periods of germination and drying being inherent in the construction and association of the parts so that the human labor and supervision required is reduced to a minimum and a uniform product is always produced.

While I have described and illustrated a preferred embodiment, by way of example, it is to be understood that the invention is not limited to that precise embodiment and that changes and modifications may be effected therein without departing from the spirit and scope of the invention.

What I claim is:

1. In apparatus for producing malt; the combination of at least one annular, perforated conveyor member mounted for movement along a circular closed path, means defining an annular channel receiving said conveyor member, sealing means in said channel above and below said conveyor member and circumferentially separating said channel into germinating and kiln zones, means for continuously depositing steeped grain on said conveyor member at the beginning of said germinating zone, means for inducing air flow upwardly through said perforated conveyor member in said germinating zone, means for controlling the humidity of the air flowing upwardly through said conveyor member in said germinating zone, means for passing heated air upwardly through said perforated conveyor member in said kiln zone, and means disposed adjacent the end of said kiln zone for continuously removing dried malt from said conveyor member.

2. In apparatus for producing malt; the combination according to claim 1, further including turning means disposed in said germinating and kiln zones of said channel and operative to turn the grain and malt on said conveyor member.

3. In apparatus for producing malt; the combination of a housing including concentric, circular inner and outer walls and horizontal top and bottom walls to define an annular channel, an annular, perforated conveyor member disposed in said channel and mounted for movement along a circular closed path, means defining a loading station at a location adjacent said circular path and operative to continuously deposit steeped grain onto said conveyor as the latter moves past said loading station, angularly spaced apart sealing means extending radially in said channel above and below said conveyor member and dividing said channel circumferentially into germinating and kiln zones with said loading station being disposed in said germinating zone and adjacent to the sealing means separating the beginning of said germinating zone from the end of said kiln zone, annular sealing means between said inner and outer walls of the housing and the adjacent sides of said conveyor member to separate the space in said channel above said conveyor member from the space in said channel below said conveyor member and to ensure that any air flow between said spaces above and below said conveyor member occurs through said perforated conveyor member, means for continuously moving said conveyor member along said closed path, means for effecting an air flow of controlled humidity upwardly through said perforated conveyor member and the grain on the latter in said germinating zone, means for passing heated air upwardly through said perforated conveyor member and malt on the latter in said kiln zone to effect drying of the malt, and means located between said loading station and said sealing means separating the beginning of the germinating zone from the end of the kiln zone for continuously removing the dried malt from said conveyor member.

4. In apparatus for producing malt; the combination according to claim 3, further including turning means disposed in said germinating zone and in said kiln zone above said conveyor member for respectively turning the grain and malt on the latter.

5. In apparatus for producing malt; the combination according to claim 3, wherein said means operative to continuously deposit steeped grain onto the conveyor member includes steeping tanks disposed above said top wall of the housing, means for feeding grain to said steeping tanks, and a hopper disposed at said loading station and extending into said channel across the width of said conveyor member, said hopper receiving the steeped grain from said tanks to deposit it uniformly across the conveyor member.

6. In apparatus for producing malt; the combination according to claim 3, wherein each of said angularly spaced apart sealing means extending radially in said channel includes a radial partition disposed below said conveyor member and abutting against said inner, outer and bottom walls, flexible means on said radial partition effecting sealing engagement with the bottom of said conveyor member, a sealing member mounted above said conveyor member for rotation about a horizontal radially extending axis and having radial vanes formed to dip into the grain on said conveyor member, and an arcuate plate mounted above said conveyor member and joined to said inner, outer and top walls, said arcuate plate being formed to be successively engaged by the edges of said vanes as the latter move out of the grain on said conveyor member.

7. In apparatus for producing malt; the combination according to claim 6, further including means mounting at least one of said angularly spaced apart sealing means above and below said conveyor for angular movement within said annular channel to provide for adjustment of the relative lengths of said germinating and kiln zones along said circular closed path.

8. In apparatus for producing malt; the combination according to claim 3, wherein each of said angularly spaced apart sealing means includes a rotatable, horizontal shaft extending radially in said channel above said conveyor member, a series of angularly spaced vanes extending radially from said shaft and adapted to successively dip into grain on said conveyor member as the latter is moved along said closed path, a plate member extending downwardly from said top wall between said inner and outer walls and including an arcuate portion concentric with the axis of rotation of said shaft, and flexible sealing strips extending along the edges of said vanes and effecting sealing engagement with said arcuate portion of the plate members as said vanes move out of the grain on said conveyor member.

9. In apparatus for producing malt; the combination according to claim 3, wherein said annular sealing means include annular overlapping members extending radially from said inner and outer walls of the housing and from the adjacent sides of said conveyor member, an upwardly opening trough member extending along the edges of the underlying ones of said annular members for containing a sealing liquid, and a depending member formed along the edge of each of the overlying ones of said annular members and extending into the related trough member to dip into the sealing liquid in the latter.

10. In apparatus for producing malt; the combination according to claim 3, wherein said means for effecting an air flow upwardly through the conveyor member in said germinating zone includes means defining an attemperating chamber below said bottom wall of the housing, means for admitting atmospheric air to said attemperating chamber, said bottom wall of the housing having openings therein communicating said attemperating chamber with said germinating zone of the channel, means in said attemperating chamber for humidifying the air admitted thereto, and exhaust means communicating with said germinating zone of the channel through said top wall of the housing and operative to exhaust air from said space above the conveyor member in said germinating zone.

11. In apparatus for producing malt; the combination according to claim 10, wherein said means for effecting an air flow upwardly through said conveyor member in said germinating zone further includes radially extending vertical partitions in said space below the conveyor member in said germinating zone for dividing said space below the conveyor member in the germinating zone into a plurality of sections, said partitions having openings therethrough and adjustable means for restricting said partition openings to control the flow of air between said sections, said openings in the bottom wall of the housing communicating with one of said sections, and said outer wall of the housing having openings therein communicating with the remainder of said sections to admit atmospheric air to the latter so that said partitions control the mixing of humidified and atmospheric air in said sections of the space below said conveyor member.

12. In apparatus for producing malt; the combination according to claim 3, wherein said means for passing heated air upwardly through the conveyor member in said kiln zone includes means defining a heating chamber below said bottom wall of the housing, means for admitting atmospheric air to said heating chamber, means in said heating chamber for heating the atmospheric air admitted thereto, said bottom wall of the housing having openings therein communicating said heating chamber with said space below the conveyor member in said kiln zone, and exhaust means communicating with said kiln zone of the channel through said top wall of the housing and operative to exhaust air from said space above the conveyor member in said kiln zone.

13. In apparatus for producing malt; the combination according to claim 3, wherein said means for continuously removing the dried malt from the conveyor member includes a fixed conduit member having an intermediate section thereof extending across said conveyor member and in close proximity to the upper surface of the latter, said section of the conduit member having a longitudinal opening at the side thereof facing in the direction opposed to the movement of said conveyor member, fixed means engageable with said conveyor member for guiding the dried malt on the latter toward said opening of the conduit member, and exhaust means connected to the opposite ends of said conduit member to produce a reduced air pressure in the latter for causing flow of the dried malt along said conduit member from said longitudinal opening toward said opposite ends of the conduit member.

14. In apparatus for producing malt; the combination according to claim 13, wherein said exhaust means is disposed in the central space defined by said circular inner wall of the housing for discharging the dried malt into said central space, and including hopper means at the bottom of said central space for collecting the discharged dried malt.

References Cited in the file of this patent

UNITED STATES PATENTS

| Number | Name | Date |
| --- | --- | --- |
| 359,284 | Plummer | Mar. 15, 1887 |
| 481,958 | Krause | Sept. 6, 1892 |
| 554,973 | Bates | Feb. 18, 1896 |
| 620,139 | Hysore | Feb. 28, 1899 |
| 666,428 | Leighton | Jan. 22, 1901 |
| 758,083 | Lapp | Apr. 26, 1904 |
| 951,286 | Mueller | Mar. 8, 1910 |

FOREIGN PATENTS

| Number | Country | Date |
| --- | --- | --- |
| 496,723 | Great Britain | Dec. 1, 1938 |